United States Patent
Shaw et al.

(10) Patent No.: US 12,086,098 B2
(45) Date of Patent: Sep. 10, 2024

(54) FILE TIERING TO DIFFERENT STORAGE CLASSES OF A CLOUD STORAGE PROVIDER

(71) Applicant: EMC IP Holding Company LLC, Hopkinton, MA (US)

(72) Inventors: Rabi Shankar Shaw, Bangalore (IN); Anurag Bhatnagar, Bangalore (IN); Joyanto Biswas, Bangalore (IN); Akshay Jagirdar, Bengaluru (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/405,707

(22) Filed: Aug. 18, 2021

(65) Prior Publication Data
US 2023/0058908 A1  Feb. 23, 2023

(51) Int. Cl.
*G06F 15/16* (2006.01)
*G06F 16/11* (2019.01)
*G06F 16/16* (2019.01)
*G06F 16/17* (2019.01)
*G06F 16/182* (2019.01)

(52) U.S. Cl.
CPC .......... *G06F 16/113* (2019.01); *G06F 16/119* (2019.01); *G06F 16/164* (2019.01); *G06F 16/1734* (2019.01); *G06F 16/1827* (2019.01)

(58) Field of Classification Search
None
See application file for complete search history.

(56) References Cited

U.S. PATENT DOCUMENTS

| | | | |
|---|---|---|---|
| 8,949,208 B1* | 2/2015 | Xu | G06F 3/0641 707/661 |
| 9,020,987 B1* | 4/2015 | Nanda | G06F 16/1734 707/821 |
| 2006/0101084 A1* | 5/2006 | Kishi | G06F 3/0685 |

(Continued)

OTHER PUBLICATIONS

Allen. Hard links and Unix file system nodes (inodes). 2020, pp. 1-6. https://teaching.idallen.com/dat2330/04f/notes/links_and_inodes. html#:~:text=For%20each%20inode%2C%20no%20matter, its%20link%20count%20is%20one (Year: 2020).*

(Continued)

*Primary Examiner* — Alex Gofman
*Assistant Examiner* — Shelly X Qian
(74) *Attorney, Agent, or Firm* — Ryan, Mason & Lewis, LLP

(57) ABSTRACT

A method comprises receiving an input specifying one or more rules for archiving a plurality of files from a source storage location to a target storage location, wherein the target storage location comprises a cloud storage platform comprising a plurality of storage classes. In the method, one or more of the plurality of files are retrieved from the source storage location for migration to the target storage location based at least in part on the one or more rules. Assignment of the one or more of the plurality of files to respective ones of the plurality of storage classes is controlled based at least in part on the one or more rules. The one or more rules specify one or more constraints for the assignment of the one or more of the plurality of the files to the respective ones of the plurality of storage classes.

20 Claims, 9 Drawing Sheets

(56) References Cited

U.S. PATENT DOCUMENTS

| | | | |
|---|---|---|---|
| 2013/0110967 A1* | 5/2013 | Ueoka | G06F 16/185 |
| | | | 709/214 |
| 2015/0134589 A1* | 5/2015 | Marrelli | G06F 16/254 |
| | | | 707/602 |
| 2017/0024408 A1* | 1/2017 | Foley | G06F 21/62 |
| 2017/0093913 A1* | 3/2017 | Summers | H04L 63/105 |

OTHER PUBLICATIONS

Dell EMC, "Dell EMC Unity: CLout Tiering Appliance (CTA) A Detailed Review," White Paper, Mar. 2019, 32 pages.

\* cited by examiner

```
# Initialize parser
parser = argparse.ArgumentParser()

parser.add_argument("-s", "--source", help = "Source to fetch the files from")

args = parser.parse_args()

source_folder = args.source
listOfFiles = list()

#create instance for AWS resources
objAWS = boto3.resource('s3')

# Get the source folder and walk over
print("Traversing source folder for files to archive...")
if os.path.isdir(source_folder):
    for (dirpath, dirnames, filenames) in os.walk(source_folder):
        listOfFiles += [os.path.join(dirpath, file) for file in filenames]

now = datetime.now()
dt_string = now.strftime("%Y-%m-%d %H:%M:%S")
```

```
#iterate over each file and put on AWS S3
for file in list(listOFFiles):
    #Gets the file access time
    print("*************************************************")
    print("Fetching the access time-stamp of \"%s\"" % (file))
    file_access_time = os.path.getatime(file)
    file_access_time = time.strftime('%Y-%m-%d %H:%M:%S', time.localtime(file_access_time))
    diff = datetime.strptime(dt_string, "%Y-%m-%d %H:%M:%S") - datetime.strptime(file_access_time, "%Y-%m-%d %H:%M:%S")
    print("\"%s\" was last accessed on \"%s\" (%s day(s) older)" % (file, file_access_time, diff.days))
    years = diff.days/365
    time.sleep(10)
    if years >= 5:
        data = open(file, 'rb')
        print("%s is 5 years older, tiering to \"GLACIER\" storage class of AWS" % (file))
        objAWS.Bucket('emc-cta-rabi1').put_object(Key=file, Body=data, StorageClass='GLACIER')
    elif years >= 3:
        data = open(file, 'rb')
        print("%s is 3 years older, tiering to \"STANDARD_1A\" storage class of AWS" % (file))
        objAWS.Bucket('emc-cta-rabi1').put_object(Key=file, Body=data, StorageClass='STANDARD_1A')
    else:
        data = open(file, 'rb')
        print("%s is 1 year older, tiering to \"STANDARD\" storage class of AWS" % (file))
        objAWS.Bucket('emc-cta-rabi1').put_object(Key=file, Body=data)
    print("*************************************************\n")
```

FIG. 2 (cont'd)

```
*********************************************************
Fetching the access time-stamp of "C:\Users\jagira\Desktop\Ship_to_cloud\Five_year_old_1.txt"
"C:\Users\jagira\Desktop\Ship_to_cloud\Five_year_old_1.txt" was last accessed on "2016-06-04 17:10:00" (1898 day(s) older)
C:\Users\jagira\Desktop\Ship_to_cloud\Five_year_old_1.txt is 5 years older, tiering to "GLACIER" storage class of AWS
*********************************************************
Fetching the access time-stamp of "C:\Users\jagira\Desktop\Ship_to_cloud\Five_year_old_2.txt"
"C:\Users\jagira\Desktop\Ship_to_cloud\Five_year_old_2.txt" was last accessed on "2016-06-04 17:10:00" (1898 day(s) older)
C:\Users\jagira\Desktop\Ship_to_cloud\Five_year_old_2.txt is 5 years older, tiering to "GLACIER" storage class of AWS
*********************************************************
Fetching the access time-stamp of "C:\Users\jagira\Desktop\Ship_to_cloud\Less_than_one_year_1.txt"
"C:\Users\jagira\Desktop\Ship_to_cloud\Less_than_one_year_1.txt" was last accessed on "2021-08-16 15:45:26" (0 day(s) older)
C:\Users\jagira\Desktop\Ship_to_cloud\Less_than_one_year_1.txt is 1 year older, tiering to "STANDARD" storage class of AWS
*********************************************************
Fetching the access time-stamp of "C:\Users\jagira\Desktop\Ship_to_cloud\Less_than_one_year_2.txt"
"C:\Users\jagira\Desktop\Ship_to_cloud\Less_than_one_year_2.txt" was last accessed on "2021-08-16 15:45:31" (0 day(s) older)
C:\Users\jagira\Desktop\Ship_to_cloud\Less_than_one_year_2.txt is 1 year older, tiering to "STANDARD" storage class of AWS
*********************************************************
```

FIG. 3

```
************************************************
Fetching the access time-stamp of "C:\Users\jagira\Desktop\Ship_to_cloud\One_year_old_1.txt"
"C:\Users\jagira\Desktop\Ship_to_cloud\One_year_old_1.txt" was last accessed on "2020-06-04 17:10:00" (437 day(s) older)
C:\Users\jagira\Desktop\Ship_to_cloud\One_year_old_1.txt is 1 year older, tiering to "STANDARD" storage class of AWS
************************************************
Fetching the access time-stamp of "C:\Users\jagira\Desktop\Ship_to_cloud\One_year_old_2.txt"
"C:\Users\jagira\Desktop\Ship_to_cloud\One_year_old_2.txt" was last accessed on "2020-06-04 17:10:00" (437 day(s) older)
C:\Users\jagira\Desktop\Ship_to_cloud\One_year_old_2.txt is 1 year older, tiering to "STANDARD" storage class of AWS
************************************************
Fetching the access time-stamp of "C:\Users\jagira\Desktop\Ship_to_cloud\Three_year_old_1.txt"
"C:\Users\jagira\Desktop\Ship_to_cloud\Three_year_old_1.txt" was last accessed on "2018-06-04 17:10:00" (1168 day(s) older)
C:\Users\jagira\Desktop\Ship_to_cloud\Three_year_old_1.txt is 3 years older, tiering to " STANDARD_IA" storage class of AWS
************************************************
Fetching the access time-stamp of "C:\Users\jagira\Desktop\Ship_to_cloud\Three_Year_old_2.txt"
"C:\Users\jagira\Desktop\Ship_to_cloud\Three_Year_old_2.txt" was last accessed on "2018-06-04 17:10:00" (1168 day(s) older)
C:\Users\jagira\Desktop\Ship_to_cloud\Three_Year_old_2.txt is 3 years older, tiering to " STANDARD_IA" storage class of AWS
```

FIG. 3 (cont'd)

| File | Size | Type | Last Modified | Storage Class |
|---|---|---|---|---|
| C:\Users\jagira\Desktop\ship_to_cloud\Five_year_old_1.txt | 4 bytes | Text Document | 11/18/2020 1:31:16 PM | GLACIER |
| C:\Users\jagira\Desktop\ship_to_cloud\less_than_year_1.txt | 29 bytes | Text Document | 11/18/2020 1:31:17 PM | STANDARD |
| C:\Users\jagira\Desktop\ship_to_cloud\One_year_old_1.txt | 29 bytes | Text Document | 11/18/2020 1:31:18 PM | STANDARD |
| C:\Users\jagira\Desktop\ship_to_cloud\Three_year_old_1.txt | 29 bytes | Text Document | 11/18/2020 1:31:20 PM | STANDARD_IA |

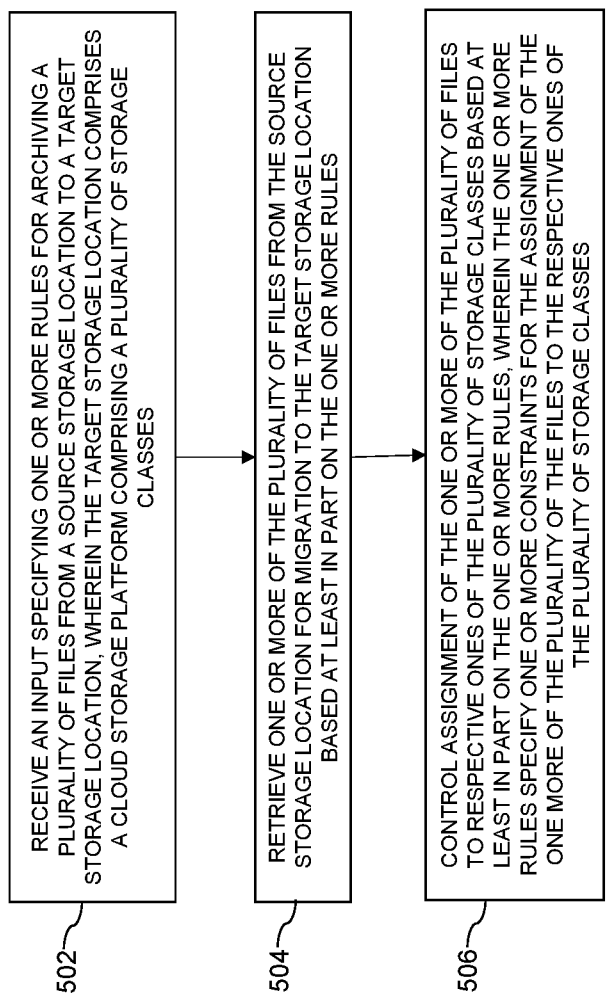

FILE TIERING TO DIFFERENT STORAGE CLASSES OF A CLOUD STORAGE PROVIDER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to storage in information processing systems.

BACKGROUND

In data storage, files that are frequently used and/or critical are generally stored in local storage for fast access. Files that are less frequently used and that do not require the same level of access as the files in local storage can be archived and stored in, for example, low-cost object and cloud storage tiers.

Some cloud storage providers provide different storage classes providing different levels of file access at different costs. Depending on the storage class in which data is stored, the speed at which the data is accessed may vary, with faster access being available at a higher cost. Current cloud storage approaches fail to address storage needs when storing data in given storage classes, which may result in unwanted and unnecessary expense.

SUMMARY

Illustrative embodiments provide techniques for migration of data to different storage classes of a cloud storage platform.

In one embodiment, a method comprises receiving an input specifying one or more rules for archiving a plurality of files from a source storage location to a target storage location, wherein the target storage location comprises a cloud storage platform comprising a plurality of storage classes. In the method, one or more of the plurality of files are retrieved from the source storage location for migration to the target storage location based at least in part on the one or more rules. Assignment of the one or more of the plurality of files to respective ones of the plurality of storage classes is controlled based at least in part on the one or more rules. The one or more rules specify one or more constraints for the assignment of the one or more of the plurality of the files to the respective ones of the plurality of storage classes.

These and other illustrative embodiments include, without limitation, methods, apparatus, networks, systems and processor-readable storage media.

BRIEF DESCRIPTION OF THE DRAWINGS

FIG. 2 depicts example pseudocode corresponding to an archiving policy for designating and assigning files to certain cloud storage classes according to an illustrative embodiment.

FIG. 3 depicts a screenshot of the progress of an archiving operation implementing an archiving policy for designating and assigning files to certain cloud storage classes according to an illustrative embodiment.

FIG. 4 depicts a table of files archived according to an archiving policy, and their corresponding storage class according to an illustrative embodiment.

FIG. 5 depicts a process for managing migration of data to different storage classes of a cloud storage platform according to an illustrative embodiment.

DETAILED DESCRIPTION

Figure 1:
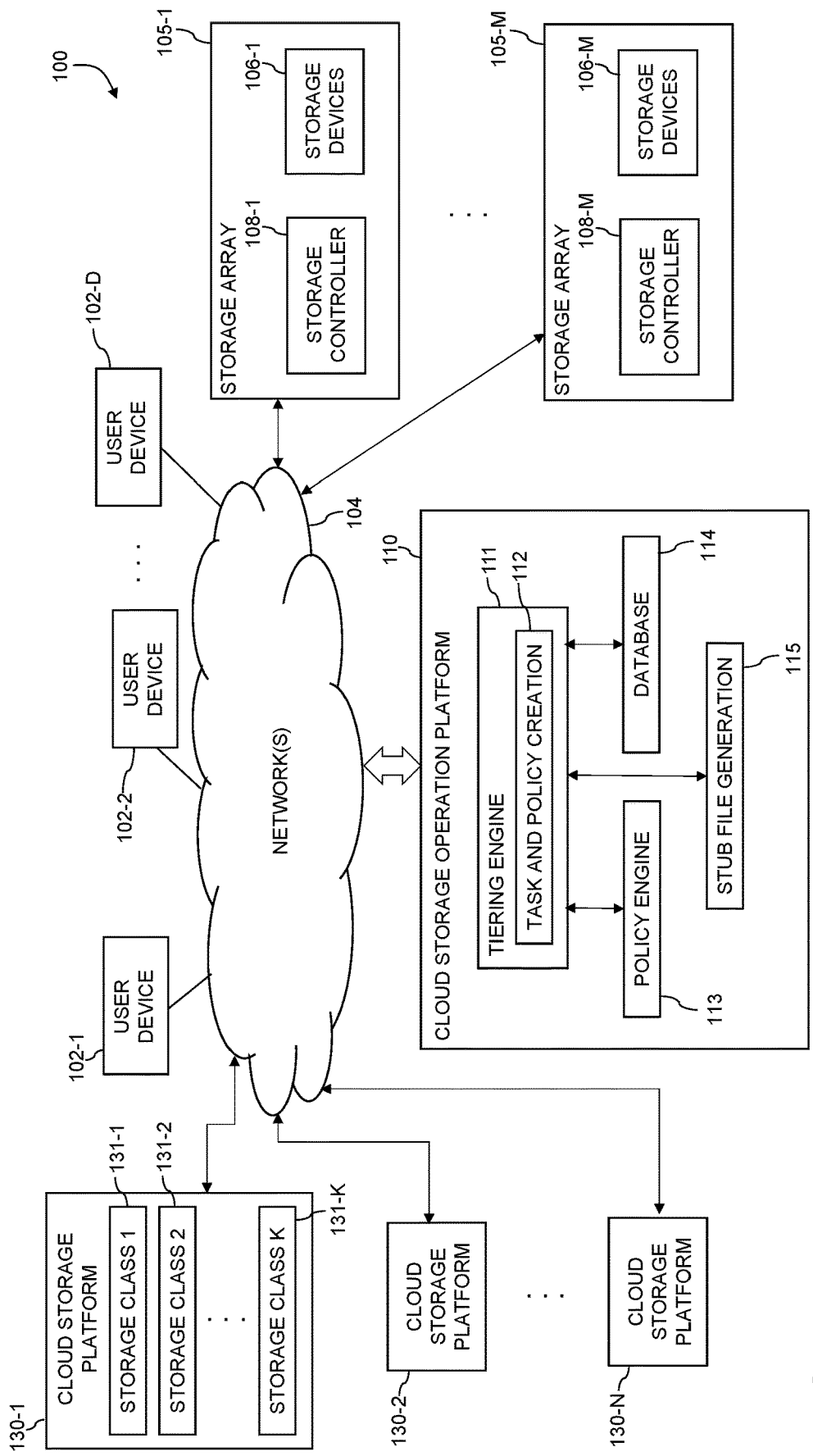
FIG. 1 depicts details of an information processing system with a cloud storage operation platform for managing migration of data to different storage classes of a cloud storage platform according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "stub file" refers to a file placed in an original file location on a storage device when the original file is archived to an archive location, such as, for example, a cloud storage platform. According to an embodiment, when a stub file is read in an input-output (TO) operation, the IO operation is passed through to the original file located in the archive location, and the original file may be presented to a user as if the original file were in its original location on the storage device. The stub file occupies less memory space ("size on disk") than the original file.

Illustrative embodiments provide techniques for storage of data in different cloud platform storage classes based on one or more policies. Advantageously, users can input one or more policies which define different criteria for assignment of files to respective storage classes of a cloud platform, and which can be implemented during file tiering.

FIG. 1 shows an information processing system 100 configured in accordance with an illustrative embodiment. The information processing system 100 comprises user devices 102-1, 102-2, . . . 102-D (collectively "user devices 102"). The user devices 102 communicate over a network 104 with a cloud storage operation platform 110. A non-limiting example of a cloud storage operation platform 110 comprises a cloud tiering appliance (CTA), but the embodiments are not necessarily limited thereto. The user devices 102 may also communicate over the network 104 with a plurality of storage arrays 105-1, . . . 105-M, collectively referred to herein as storage arrays 105. The storage arrays 105 comprise respective sets of storage devices 106-1, . . . 106-M, collectively referred to herein as storage devices 106, coupled to respective storage controllers 108-1, . . . 108-M, collectively referred to herein as storage controllers 108.

The user devices 102 can comprise, for example, Internet of Things (IoT) devices, desktop, laptop or tablet computers, mobile telephones, or other types of processing devices capable of communicating with the cloud storage operation platform 110 and each other over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as K, L, M, N and P are assumed to be arbitrary positive integers greater than or equal to two.

The terms "client," "customer," "administrator" or "user" herein are intended to be broadly construed so as to encompass numerous arrangements of human, hardware, software or firmware entities, as well as combinations of such entities. At least a portion of the available services and functionalities provided by the cloud storage operation platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the cloud storage operation platform 110, as well as to support communication between the cloud storage operation platform 110 and connected devices (e.g., user devices 102) and/or other related systems and devices not explicitly shown.

Users may refer to customers, clients and/or administrators of computing environments for which archiving and migration are being performed. For example, in some embodiments, the user devices 102 are assumed to be associated with repair technicians, system administrators, information technology (IT) managers, software developers release management personnel or other authorized personnel configured to access and utilize the cloud storage operation platform 110.

The cloud storage operation platform 110 of the system 100 is configured to move data between the storage arrays 105 and one or more cloud storage platforms 130-1, 130-2, . . . 130-N, collectively referred to herein as cloud storage platforms 130. The cloud storage operation platform 110 is also configured to move data from one of the storage arrays 105 to another one of the storage arrays 105, from one of the user devices 102 to another one of the user devices 102, between the user devices 102 and one or more storage arrays 105 or one or more cloud storage platforms 130 and between different locations (e.g., directories) within the same storage array 105 or within the same user device 102.

The cloud storage operation platform 110 is configured to move data, for example, by moving data files, snapshots or other data objects in and between the user devices 102, the storage arrays 105 and the cloud storage platforms 130. A given data object may comprise a single data file, or multiple data files. According to one or more embodiments, the cloud storage operation platform 110 permits administrators to automatically move data in and between the user devices 102, the storage arrays 105 and the cloud storage platforms 130 based on user-configured policies. The cloud storage platforms 130 include, for example, Dell® EMC® Elastic Cloud Storage (ECS), Microsoft® Azure®, Amazon® S3, and/or IBM® Cloud Object Storage (COS) platforms, or other available cloud infrastructures.

Each of the cloud storage platforms 130 comprises a plurality of storage classes. For example, the cloud storage platform 130-1 includes storage class 1 131-1, storage class 2 131-2, . . . storage class K 131-K, collectively referred to herein as storage classes 131. The storage classes may correspond to different levels, such as, for example, a first level (e.g., storage class 1) for frequently accessed data, where data retrieval is relatively fast and cost is relatively high, a second level (e.g., storage class 2) for less frequently accessed data, where data retrieval is slower and cost is lower than those of the first level, and a third level (e.g., storage class 3, where K=3) for long-term data archiving, with even greater retrieval times, and which is less expensive than the first and second levels. For example, Amazon® provides cloud storage in "Standard," "Standard-IA" and "Glacier" storage classes, and IBM® provides cloud storage in in "Standard," "Vault" and "Cold Vault" storage classes corresponding to the same or similar arrangement as the first-third levels. The number of storage classes offered by a cloud storage platform is not limited to three, and may be more or less than three. Although shown only in the cloud storage platform 130-1, it is to be understood that the other cloud storage platforms 130-2, . . . 130-N also comprise the storage classes 131.

Conventional cloud tiering software in, for example, a CTA uses one of the storage classes by default, which may not comport with the corresponding levels of access needed for the data, resulting in unwanted and/or unnecessary cost. For example, users may not want or need to access the data frequently. Such default selection of a storage class of the cloud service provider may lead to inadvertent use of a higher access and higher cost storage class, even though the data might be suited for a lower access and lower cost storage class.

The cloud storage operation platform 110 in the present embodiment is assumed to be accessible to the user devices 102, and vice-versa, over the network 104. In addition, the cloud storage operation platform 110 and the user devices 102 can access the storage arrays 105 and the cloud storage platforms 130 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The cloud storage operation platform 110, on behalf of respective infrastructure tenants each corresponding to one or more users associated with respective ones of the user devices 102 provides a platform for managing migration of data to different storage classes of a cloud storage platform. Referring to FIG. 1, the cloud storage operation platform 110 comprises a tiering engine 111, a policy engine 113, a database 114 and a stub file generation engine 115. The tiering engine 111 comprises a task and policy creation component 112.

The cloud storage operation platform 110 in some embodiments comprises configurable data mover modules adapted to interact with the user devices 102, the storage arrays 105 and the cloud storage platforms 130. At least one configuration file is implemented in or otherwise associated with the cloud storage operation platform 110. The state of the configuration file may be controlled at least in part by a job scheduler implemented as part of the cloud storage operation platform 110. The job scheduler interacts with the policy engine 113.

The cloud storage operation platform 110 can include at least one application programming interface (API) that permits an external component to control selection between various modes of operation. For example, the above-noted job scheduler can access the configuration file via such an API in order to control a mode of operation of the cloud storage operation platform 110. Additionally or alternatively, an application running on one or more of the user devices 102 can access the configuration file via the API in order to control the mode of operation of the cloud storage operation platform 110.

In some embodiments, the cloud storage operation platform 110 is configurable via the configuration file in a mode of operation in which a particular type of data movement in and between user devices 102, the storage arrays 105 and the cloud storage platforms 130 occurs for a given data object being utilized by an application running on one or more of the user devices 102. Furthermore, other embodiments can configure the cloud storage operation platform 110 in different modes of operation without the use of a configuration file. Thus, such a configuration file should not be viewed as a requirement.

The cloud storage operation platform 110 is illustratively coupled to the network 104 and configured to control transfer of data in and between the user devices 102, the storage arrays 105 and the cloud storage platforms 130. The term "data movement" as used in this and other contexts herein is intended to be broadly construed, so as to encompass data migration as well as other types of movement of data and relocation in and between the user devices 102, the storage arrays 105 and the cloud storage platforms 130. A given data mover module can be implemented at least in part on storage arrays 105 or other storage platforms that implement at least portions of one or more storage tiers of the multi-tier storage system.

In one or more embodiments, the cloud storage operation platform 110 can be used to tier file data and archive block data to the cloud storage platforms 130, and to recall file data and restore block data to the storage arrays 105 from the cloud storage platforms 130. In some embodiments, the cloud storage operation platform 110 can be used to migrate repositories between cloud storage platforms 130, storage arrays and/or user devices 102.

In a file tiering process (also referred to herein as "cloud tiering") or file archiving process, the policy engine 113 is configured to identify files that fit an administrator-defined criteria, and the cloud storage operation platform 110 initiates movement of the identified files to a cloud storage platform 130. The stub file generation engine 115 creates a stub file in the original file location on, for example, the storage array 105 or the user device 102. According to an embodiment, when the stub file is read, the cloud storage operation platform 110 recalls or passes an IO operation through to the original file located in the cloud storage platform 130, and the original file may be presented to a user as if the original file were in its original location on the storage array 105 or user device 102. As explained in more detail herein, stub files comprise information about destinations in the cloud storage platforms 130 corresponding to the respective ones of the plurality of storage classes 131.

In a block archiving process, the policy engine 113 identifies block snapshots that fit an administrator-defined criteria, and the cloud storage operation platform 110 initiates archiving of the identified snapshots to a cloud storage platform 130, leaving the identified snapshots in the storage arrays 105 or user devices 102. After the identified snapshots are backed up to one or more of the cloud storage platforms 130, the original snapshots can be erased from the storage arrays 105 or user devices 102 to free up space. Users may initiate restoring of one or more snapshots to one or more of the storage arrays 105 or user devices 102.

According to an embodiment, in file tiering, file archiving and block processes, the policy engine 113 scans, for example, files and/or snapshots and applies policy rules to each file and/or snapshot. If there are multiple rules in a policy, the policy engine 113 applies the rules to a given file and/or snapshot until a rule evaluates to "true," and then takes the action associated with the rule, such as, for example, "archive" or "don't archive." Additionally, the rules specify one or more constraints for the assignment of the files and/or snapshots to respective ones of a plurality of storage classes 131. Some examples of rules governing whether files and/or blocks are archived may be based on one or more constraints such as, for example, when a file and/or snapshot was last accessed or modified, when file or snapshot attributes were last changed, and/or a size of a file or snapshot (e.g., >10 MB). Rules may also be based on file or snapshot names (e.g., only archive files or snapshots having certain names or parts of names) and/or directory name (e.g., only archive files or snapshots from specified directories or from directories having certain names or parts of names).

The embodiments provide techniques for users to set conditions on which to base selection of a particular cloud storage class for tiering files to one or more of the cloud storage platforms 130 and to implement the designated policies when migrating the data to cloud storage so that files and/or snapshots meeting the specified criteria will be sent to the appropriate storage level. More specifically, the tiering engine 111 comprises a task and policy creation component 112, which generates an interface for a user to create one or more migration tasks and one or more associated policies. The interface is accessible via, for example, the user devices 102, and enables a user to specify a plurality of parameters for a migration task. Some non-limiting examples of task parameters include: (i) a source path specifying a starting point of migration (e.g., source storage location); (ii) a destination path specifying a target storage location where the files will be moved; (iii) a migration policy specifying a set of rules (e.g., constraints) to be applied by the policy engine 113 in connection with evaluating whether and where particular files are to be migrated; (iv) one or more protocols (e.g., SMB, NFS) to use for reading the files from the source storage location and for writing the stub files to the target storage location; (v) a name of the migration (e.g., share/export name); and (vi) server names or other identifying information (e.g., IP addresses) corresponding to the source and target storage locations. According to one or more embodiments, the interface may comprise a plurality of editable fields for a user to input the task parameters.

For example, in a non-limiting embodiment, a user can utilize a "last accessed" criteria to designate storage classes 131 based on when files were last accessed. For example, the policy may state that: (1) all the data from a share/export which has not been accessed for the last year would be sent to a first storage class corresponding to a highest frequency of access, fastest access time and highest cost (e.g., $0.020/GB to $0.021/GB); (2) all the data from a share/export which has not been accessed for the last 2 years would be sent to a second storage class corresponding to a lower frequency of access, slower access time and lower cost than the first storage class (e.g., $0.0125/GB to $0.0155/GB); and (3) all the data from a share/export which has not been accessed for the last 5 years would be sent to a storage class corresponding to the lowest frequency of access, slowest access time and cheapest cost (e.g., $0.0034/GB to $0.004/GB). It is to be understood that the embodiments are not limited to the specified time periods or to rules based on access time. Other options for assignment of files to particular storage classes 131 may be based on rules requiring file attribute change and/or file modification time periods to be within certain ranges for assignment to particular storage classes 131. The ranges may be the same, similar or different from the time periods specified in connection with last access time criteria. Further options for assignment of files to particular storage classes may be based on rules corresponding certain file and/or directory names to particular storage classes 131. Modifications comprise changes in file content, and attribute changes comprise changes to various i-node fields for a file. Whenever a modified time changes, attribute change time also changes, but not vice versa. Attribute change time also changes when file ownership, size or link count changes for a file.

Once the policy is specified and generated by the task and policy creation component 112, archiving is executed by the tiering engine 111 and the policy engine 113 in accordance with the policy. For example, the tiering engine 111 retrieves files from a source storage location (e.g., a storage array 105 or user device 102) for migration to the target storage location (e.g., cloud storage platform 130) satisfying one or more rules in the policy. The policy engine 113 controls assignment of the retrieved files to respective ones of the plurality of storage classes 131 based at least in part on the one or more rules, and the tiering engine 111 manages the migration of the files to respective destinations in the cloud storage platform 130 corresponding to the respective ones of the plurality of storage classes 131. The policies and/or rules can be stored in the database 114. If the policy engine 113 determines that a given file in source storage location does not satisfy the policy constraints, that entry is skipped, the next entry is retrieved and the evaluation process is repeated for the next entry.

The stub file generation engine 115 generates a stub file in the source storage location (e.g., storage array 105) for respective ones of the files which have been migrated. The stub files comprise information (e.g., metadata) about the destinations in the target storage location (cloud storage platform 130) corresponding to the respective ones of the plurality of storage classes 131 so that the files can be retrieved when a request for access is received from, for example, a user device 102. The information may comprise, for example, server names or other identifying information (e.g., IP addresses) about the destinations in the target storage location.

FIG. 2 depicts example pseudocode 200 corresponding to defining a tiering policy to designate and assign files to certain cloud storage classes 131 based on whether the access times of the files are greater than or equal to 5 years ago, greater than or equal to 3 years ago and less than 3 years ago (e.g., one year ago). Additional or alternative criteria for designating and moving files to destinations associated with certain cloud storage classes 131 may include, but are not necessarily limited to, file modified time, file attribute change time, file size, file name and/or directory name. The pseudocode 200 includes steps for initializing a parser in connection with defining a source of files to be migrated, creating instances for cloud storage provider resources, traversing source folders, iterating over each file, retrieving access timestamps for the files, analyzing whether the access times are within the specified time periods, and assigning files to a particular storage class based on the results of the analysis. For example, according to the pseudocode 200, files having access times of (1) greater than or equal to 5 years ago are assigned to a Glacier storage class; (2) greater than or equal to 3 years ago are assigned to a Standard IA storage class; and (3) less than 3 years ago (e.g., one year ago) are assigned to a Standard storage class.

FIG. 3 depicts a screenshot 300 of the progress of a file tiering operation implementing a file tiering policy where certain files are assigned to and placed in locations corresponding to one of three cloud storage classes based on their last accessed time. For example, files "Five_year_old_1.txt" and "Five_year_old_2.txt" determined to be last accessed 1898 days prior to the execution of archiving are tiered to a Glacier storage class, files "Three_year_old_1.txt" and "Three_year_old_2.txt" determined to be last accessed 1168 days prior to the execution of archiving are tiered to a Standard IA storage class, files "One_year_old_1.txt" and "One_year_old_2.txt" determined to be last accessed 437 days prior to the execution of archiving are tiered to a Standard storage class, and files "Less_than_year_1.txt" and "Less_than_year_2.txt" determined to be last accessed 0 days prior to the execution of archiving are tiered to a Standard storage class. The screenshot 300 further depicts timestamps of when the files were last accessed.

FIG. 4 depicts a table 400 of 4 files and their corresponding storage class archived according to a file tiering policy where certain files are assigned to and placed in locations corresponding to one of three cloud storage classes based on their last accessed time. For example, files "Five_year_old_1.txt," "less_than_year_1.txt," "One_year_old_1.txt" and "Three_year_old_1.txt" are listed as corresponding to Glacier, Standard, Standard and Standard IA storage classes, respectively. The table 400 also includes details of the source directory and file name, file size, file type, and a last modified time for each file. According to one or more embodiments, the tiering engine 111 generates a visualization (e.g., in this case a table) depicting the files which have been migrated to cloud storage, their corresponding storage class and other relevant information about the files.

According to one or more embodiments, the database 114 used herein can be configured according to a relational database management system (RDBMS) (e.g., PostgreSQL). The database 114 in some embodiments is implemented using one or more storage systems or devices associated with the cloud storage operation platform 110. In some embodiments, one or more of the storage systems utilized to implement the databases comprise a scale-out all-flash content addressable storage array or other type of storage array. Similarly, the storage arrays 105 described herein may comprise scale-out all-flash content addressable storage arrays or other type of storage arrays.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the cloud storage operation platform 110, the tiering engine 111, the policy engine 113, the database 114 and the stub file generation engine 115 in other embodiments can be implemented at least in part externally to the cloud storage operation platform 110, for example, as stand-alone servers, sets of servers or other types of systems coupled to the network 104. For example, the tiering engine 111, the policy engine 113, the database 114 and the stub file generation engine 115 may be provided as cloud services accessible by the cloud storage operation platform 110.

The tiering engine 111, the policy engine 113, the database 114 and the stub file generation engine 115 in the FIG. 1 embodiment are each assumed to be implemented using at least one processing device. Each such processing device generally comprises at least one processor and an associated memory, and implements one or more functional modules for controlling certain features of the tiering engine 111, the policy engine 113, the database 114 and/or the stub file generation engine 115.

At least portions of the cloud storage operation platform 110 and the components thereof may be implemented at least in part in the form of software that is stored in memory and executed by a processor. The cloud storage operation platform 110 and the components thereof comprise further hardware and software required for running the cloud storage operation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the tiering engine 111, the policy engine 113, the database 114, the stub file generation engine 115 and other components of the cloud storage operation platform 110 in the present embodiment are shown as part of the cloud storage operation platform 110, at least a portion of the tiering engine 111, the policy engine 113, the database 114, the stub file generation engine 115 and other components of the cloud storage operation platform 110 in other embodiments may be implemented on one or more other processing platforms that are accessible to the cloud storage operation platform 110 over one or more networks. Such components can each be implemented at least in part within another system element or at least in part utilizing one or more stand-alone components coupled to the network 104.

It is assumed that the cloud storage operation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the tiering engine 111, the policy engine 113, the database 114, the stub file generation engine 115 and other components of the cloud storage operation platform 110, and the elements thereof can each be implemented in the form of one or more LXCs running on one or more VMs. Other arrangements of one or more processing devices of a processing platform can be used to implement the tiering engine 111, the policy engine 113, the database 114 and the stub file generation engine 115 as well as other components of the cloud storage operation platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the cloud storage operation platform 110 to reside in different data centers. Numerous other distributed implementations of the cloud storage operation platform 110 are possible.

Accordingly, one or each of the tiering engine 111, the policy engine 113, the database 114, the stub file generation engine 115 and other components of the cloud storage operation platform 110 can each be implemented in a distributed manner so as to comprise a plurality of distributed components implemented on respective ones of a plurality of compute nodes of the cloud storage operation platform 110.

It is to be appreciated that these and other features of illustrative embodiments are presented by way of example only, and should not be construed as limiting in any way.

Accordingly, different numbers, types and arrangements of system components such as the tiering engine 111, the policy engine 113, the database 114, the stub file generation engine 115 and other components of the cloud storage operation platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the cloud storage operation platform can be offered to cloud infrastructure customers or other users as part of FaaS, CaaS and/or PaaS offerings.

The operation of the information processing system 100 will now be described in further detail with reference to the flow diagram of FIG. 5. With reference to FIG. 5, a process 500 for managing migration of data to different storage classes of a cloud storage platform as shown includes steps 502 through 506, and is suitable for use in the system 100 but is more generally applicable to other types of information processing systems comprising a cloud storage operation platform configured for managing migration of data to different storage classes of a cloud storage platform.

In step 502, an input specifying one or more rules for archiving a plurality of files from a source storage location (e.g., one or more storage devices 106 of a storage array 105) to a target storage location is received. The target storage location comprises a cloud storage platform 130 comprising a plurality of storage classes 131. The input can be performed through an interface where a user is able to define the one or more rules. The interface may be generated by the cloud storage operation platform 130.

In step 504, one or more of the plurality of files are retrieved from the source storage location for migration to the target storage location based at least in part on the one or more rules. For example, a policy engine 113 evaluates the files to determine whether any of the files satisfy the one or more rules, and, if so, which files satisfy the one or more rules.

In step 506, assignment of the one or more of the plurality of files to respective ones of the plurality of storage classes is controlled based at least in part on the one or more rules, the rules specifying one or more constraints for the assignment of the one or more of the plurality of the files to the respective ones of the plurality of storage classes 131. For example, depending on which constraint(s) a file satisfies, the file is assigned to a particular one of the storage classes 131 corresponding to the satisfied constraint(s). In a non-limiting example, a rule may correspond to a file access time, and the constraints can relate to a time period (e.g., less than a specified time period prior to the migration) when a file was last accessed. The specified time period may be in, for example, years, months, days, etc.

The method also includes managing migration of the one or more of the plurality of files to respective destinations in the target storage location corresponding to the respective ones of the plurality of storage classes 131. In one or more embodiments, a visualization is generated (e.g., table 400), which depicts the one or more of the plurality of files which have been migrated to the target storage location and their corresponding storage class of the plurality of storage classes 131. In accordance with illustrative embodiments, a stub file is generated in the source storage location for respective ones of the one or more of the plurality of files which have been migrated. The stub files comprise information about the destinations in the target storage location corresponding to the respective ones of the plurality of storage classes 131.

According to the embodiments, the respective ones of the plurality of storage classes 131 correspond to respective levels of file retrieval speed, and respective storage costs. For example, depending on storage class, annual storage costs corresponding to respective storage classes 131 are estimated to be about $265/TB, $155/TB and $50/TB. The higher costs correspond to higher retrieval speed storage classes (where file retrieval takes less time), and the lower costs correspond to lower retrieval speed storage classes (where file retrieval takes more time).

One or more policies comprising the one or more rules are generated. In addition or as an alternative to file access time, the rules can correspond to file modification time, file attribute change time, file size, file name and/or directory name.

It is to be appreciated that the FIG. 5 process and other features and functionality described above can be adapted for use with other types of information systems configured to execute migration management services in a cloud storage operation platform or other type of platform.

The particular processing operations and other system functionality described in conjunction with the flow diagram of FIG. 5 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a cloud storage operation platform as disclosed herein can provide a number of significant advantages relative to conventional arrangements. For example, unlike conventional techniques, the embodiments advantageously enable users to utilize a CTA or other migration appliance to provide users the ability to define storage policies for assignment of different cloud storage classes based on a variety of factors, and to move data to the different storage classes based on the specified criteria. Advantageously, users can input one or more rules which define different criteria for assignment of files to respective storage classes of a cloud storage platform, and which can be implemented during file tiering.

Conventional approaches do not allow for evaluation of files in connection with the assignment of storage classes, and instead use one of the storage classes by default, which does not account for the levels of access actually needed for the data. As a result, higher storage class levels are used when they are not needed, resulting in more expense and inefficient use of storage and computing resources. For example, under current approaches, storage classes are not correctly allocated, dedicating higher access storage to cold files, when such files may be adequately stored in lower access storage. Advantageously, the embodiments reduce cloud storage expenses and make more efficient use of computer resources than current approaches by enabling users to specify and implement file tiering policies for tiering data to different storage classes of a given cloud storage provider.

Moreover, the embodiments enable automated analysis of file characteristics based on one or more policies, resulting in efficient techniques for assignment of storage classes and overall more efficient migrations. For example, the embodiments enable users to create policies for file migration and storage class assignment, and provide a policy engine which scans and evaluates files in a source storage location to automatically determine to which storage classes the files should be assigned.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the cloud storage operation platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a cloud storage operation platform in illustrative embodiments. These and other cloud-based systems in illustrative embodiments can include object stores.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
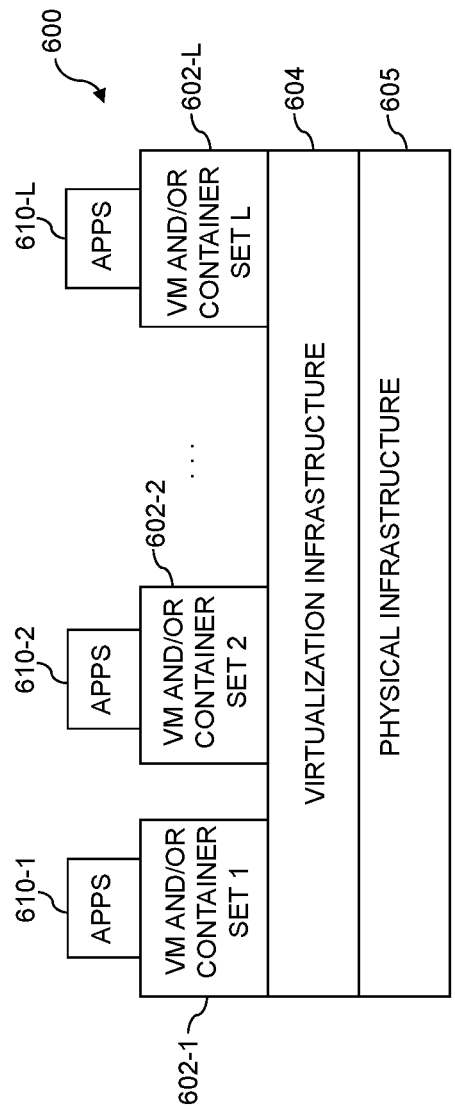
FIGS. 6 and 7 show examples of processing platforms that may be utilized to implement at least a portion of an information processing system according to illustrative embodiments.
Figure 7:
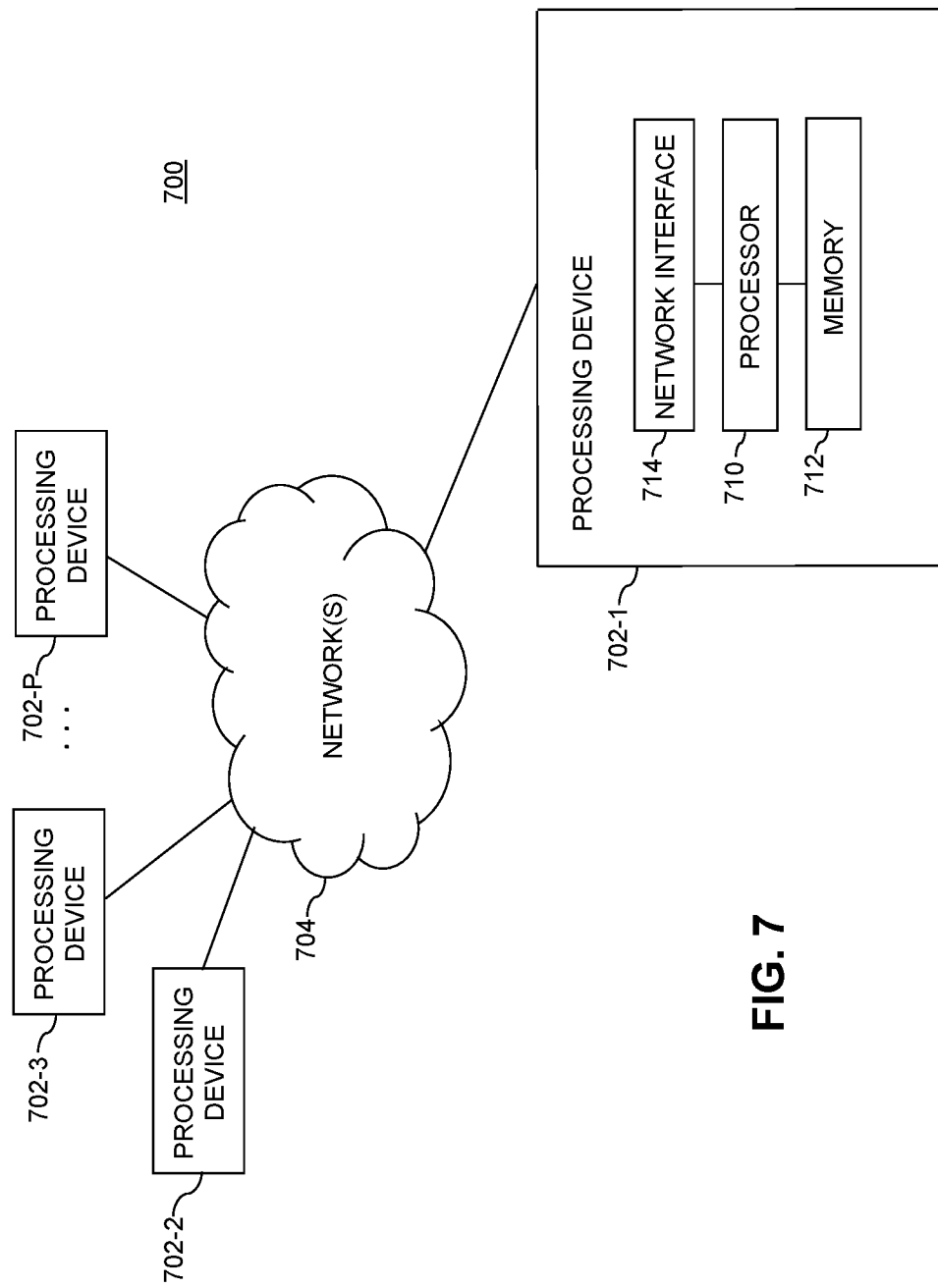

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-P, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712. The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the cloud storage operation platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and cloud storage operation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices each comprising a processor coupled to a memory;
said at least one processing platform being configured:
to receive an input specifying one or more rules for archiving a plurality of files from a source storage location to a target storage location, wherein the target storage location comprises a cloud storage platform comprising a plurality of storage classes representing respective storage levels in the cloud storage platform;
wherein the plurality of storage classes comprise at least: (i) a first storage class corresponding to a first file retrieval speed and a first cost per data unit; and (ii) a second storage class corresponding to a second file retrieval speed greater than the first file retrieval speed and a second cost per data unit greater than the first cost per data unit;
to retrieve one or more of the plurality of files from the source storage location for migration to the target storage location based at least in part on the one or more rules, wherein the one or more rules include a first criteria specifying a first last file access time threshold for identifying which of the plurality of files to retrieve from the source storage location; and
to control assignment of the one or more of the plurality of files to respective ones of the plurality of storage classes based at least in part on the one or more rules;
wherein the one or more rules specify one or more constraints for the assignment of the one or more of the plurality of the files to the respective ones of the plurality of storage classes, the one or more constraints comprising at least a second criteria for determining respective subsets of the one or more of the plurality of files to assign to the respective ones of the plurality of storage classes, the second criteria specifying: (i) a second last file access time threshold; and (ii) one or more attribute changes to one or more i-node fields of the one or more of the plurality of files, the one or more attribute changes comprising a file ownership change and a link count change for the one or more of the plurality of files;
wherein, in controlling the assignment of the one or more of the plurality of files to the respective ones of the plurality of storage classes, said at least one processing platform is configured:
  to determine whether a given file of the one or more of the plurality of files has a last file access time greater than the second last file access time threshold and includes the one or more attribute changes; and
  to write one of: (i) a first object corresponding to the given file in the first storage class on the cloud storage platform if the last file access time of the given file is determined to be greater than the second last file access time threshold, the given file is determined to include the one or more attribute changes and the given file belongs to a first one of the respective subsets; and (ii) a second object corresponding to the given file in the second storage class on the cloud storage platform if the last file access time of the given file is determined to be less than the second last file access time threshold, the given file is determined to include the one or more attribute changes and the given file belongs to a second one of the respective subsets; and
wherein said at least one processing platform is further configured:
  to display progress of the assignment of the one or more of the plurality of files to the respective ones of the plurality of storage classes, wherein the display of the progress of the assignment comprises: (i) details of progress of retrieval of at least one timestamp associated with the last file access time of the given file; (ii) an indication of a temporal relationship between the last file access time of the given file and a time for execution of the archiving; and (iii) details of whether the given file was tiered to one of the first storage class and the second storage class; and
  to generate an interface for a user to define the one or more rules, wherein the interface comprises a plurality of editable fields for the user to input task parameters comprising: (i) a path for the source storage location; (ii) a path for the target storage location; (iii) the one or more constraints; and (iv) one or more protocols to use for reading the plurality of files and for generating a plurality of stub files;
wherein at least one configuration file is implemented in the at least one processing platform and is accessible by a job scheduler via an application programming interface to control a mode of operation of the at least one processing platform.

2. The apparatus of claim 1 wherein said at least one processing platform is further configured to manage migration of the one or more of the plurality of files to respective destinations in the target storage location corresponding to the respective ones of the plurality of storage classes.

3. The apparatus of claim 2 wherein said at least one processing platform is further configured to generate a visualization depicting the one or more of the plurality of files which have been migrated to the target storage location and their corresponding storage class of the plurality of storage classes.

4. The apparatus of claim 2, wherein said at least one processing platform is further configured to generate a stub file in the source storage location for respective ones of the one or more of the plurality of files which have been migrated.

5. The apparatus of claim 4 wherein the plurality of stub files comprise information about the destinations in the target storage location corresponding to the respective ones of the plurality of storage classes.

6. The apparatus of claim 1 wherein said at least one processing platform is further configured to generate one or more policies comprising the one or more rules.

7. The apparatus of claim 1 wherein the one or more rules further correspond to at least one of a file modification time, a file attribute change time, a file size, a file name and a directory name.

8. The apparatus of claim 1 wherein said at least one processing platform comprises a cloud tiering appliance.

9. A method comprising:
  receiving an input specifying one or more rules for archiving a plurality of files from a source storage location to a target storage location, wherein the target storage location comprises a cloud storage platform comprising a plurality of storage classes representing respective storage levels in the cloud storage platform;
  wherein the plurality of storage classes comprise at least: (i) a first storage class corresponding to a first file retrieval speed and a first cost per data unit; and (ii) a second storage class corresponding to a second file retrieval speed greater than the first file retrieval speed and a second cost per data unit greater than the first cost per data unit;
  retrieving one or more of the plurality of files from the source storage location for migration to the target storage location based at least in part on the one or more rules, wherein the one or more rules include a first criteria specifying a first last file access time threshold for identifying which of the plurality of files to retrieve from the source storage location; and
  controlling assignment of the one or more of the plurality of files to respective ones of the plurality of storage classes based at least in part on the one or more rules;
  wherein the one or more rules specify one or more constraints for the assignment of the one or more of the plurality of the files to the respective ones of the plurality of storage classes, the one or more constraints comprising at least a second criteria for determining respective subsets of the one or more of the plurality of files to assign to the respective ones of the plurality of storage classes, the second criteria specifying: (i) a second last file access time threshold; and (ii) one or more attribute changes to one or more i-node fields of the one or more of the plurality of files, the one or more attribute changes comprising a file ownership change and a link count change for the one or more of the plurality of files;
  wherein controlling the assignment of the one or more of the plurality of files to the respective ones of the plurality of storage classes comprises:
  determining whether a given file of the one or more of the plurality of files has a last file access time greater than the second last file access time threshold and includes the one or more attribute changes; and
  writing one of: (i) a first object corresponding to the given file in the first storage class on the cloud storage platform if the last file access time of the given file is determined to be greater than the second last file access time threshold, the given file is determined to include the one or more attribute changes and the given file belongs to a first one of the respective subsets; and (ii) a second object corresponding to the given file in the second storage class on the cloud storage platform if the last file access time of the given file is determined to be less than the second last file access time threshold, the given file is determined to include the one or more attribute changes and the given file belongs to a second one of the respective subsets;

wherein the method further comprises:

displaying progress of the assignment of the one or more of the plurality of files to the respective ones of the plurality of storage classes, wherein the display of the progress of the assignment comprises: (i) details of progress of retrieval of at least one timestamp associated with the last file access time of the given file; (ii) an indication of a temporal relationship between the last file access time of the given file and a time for execution of the archiving; and (iii) details of whether the given file was tiered to one of the first storage class and the second storage class; and generating an interface for a user to define the one or more rules, wherein the interface comprises a plurality of editable fields for the user to input task parameters comprising: (i) a path for the source storage location; (ii) a path for the target storage location; (iii) the one or more constraints; and (iv) one or more protocols to use for reading the plurality of files and for generating a plurality of stub files;

wherein the method is performed by at least one processing platform comprising at least one processing device comprising a processor coupled to a memory; and wherein at least one configuration file is implemented in the at least one processing platform and is accessible by a job scheduler via an application programming interface to control a mode of operation of the at least one processing platform.

10. The method of claim 9 further comprising managing migration of the one or more of the plurality of files to respective destinations in the target storage location corresponding to the respective ones of the plurality of storage classes.

11. A computer program product comprising a non-transitory processor-readable storage medium having stored therein program code of one or more software programs, wherein the program code when executed by at least one processing platform causes said at least one processing platform:

to receive an input specifying one or more rules for archiving a plurality of files from a source storage location to a target storage location, wherein the target storage location comprises a cloud storage platform comprising a plurality of storage classes representing respective storage levels in the cloud storage platform;

wherein the plurality of storage classes comprise at least: (i) a first storage class corresponding to a first file retrieval speed and a first cost per data unit; and (ii) a second storage class corresponding to a second file retrieval speed greater than the first file retrieval speed and a second cost per data unit greater than the first cost per data unit;

to retrieve one or more of the plurality of files from the source storage location for migration to the target storage location based at least in part on the one or more rules, wherein the one or more rules include a first criteria specifying a first last file access time threshold for identifying which of the plurality of files to retrieve from the source storage location; and to control assignment of the one or more of the plurality of files to respective ones of the plurality of storage classes based at least in part on the one or more rules;

wherein the one or more rules specify one or more constraints for the assignment of the one or more of the plurality of the files to the respective ones of the plurality of storage classes, the one or more constraints comprising at least a second criteria for determining respective subsets of the one or more of the plurality of files to assign to the respective ones of the plurality of storage classes, the second criteria specifying: (i) a second last file access time threshold; and (ii) one or more attribute changes to one or more i-node fields of the one or more of the plurality of files, the one or more attribute changes comprising a file ownership change and a link count change for the one or more of the plurality of files;

wherein, in controlling the assignment of the one or more of the plurality of files to the respective ones of the plurality of storage classes, the program code further causes said at least one processing platform:

to determine whether a given file of the one or more of the plurality of files has a last file access time greater than the second last file access time threshold and includes the one or more attribute changes; and to write one of: (i) a first object corresponding to the given file in the first storage class on the cloud storage platform if the last file access time of the given file is determined to be greater than the second last file access time threshold, the given file is determined to include the one or more attribute changes and the given file belongs to a first one of the respective subsets; and (ii) a second object corresponding to the given file in the second storage class on the cloud storage platform if the last file access time of the given file is determined to be less than the second last file access time threshold, the given file is determined to include the one or more attribute changes and the given file belongs to a second one of the respective subsets; and wherein the program code further causes said at least one processing platform:

to display progress of the assignment of the one or more of the plurality of files to the respective ones of the plurality of storage classes, wherein the display of the progress of the assignment comprises: (i) details of progress of retrieval of at least one timestamp associated with the last file access time of the given file; (ii) an indication of a temporal relationship between the last file access time and a time for execution of the archiving; and (iii) details of whether the given file was tiered to one of the first storage class and the second storage class; and to generate an interface for a user to define the one or more rules, wherein the interface comprises a plurality of editable fields for the user to input task parameters comprising: (i) a path for the source storage location; (ii) a path for the target storage location; (iii) the one or more constraints; and (iv) one or more protocols to use for reading the plurality of files and for generating a plurality of stub files;

wherein at least one configuration file is implemented in the at least one processing platform and is accessible by a job scheduler via an application programming interface to control a mode of operation of the at least one processing platform.

12. The computer program product according to claim 11 wherein the program code further causes said at least one processing platform to manage migration of the one or more of the plurality of files to respective destinations in the target storage location corresponding to the respective ones of the plurality of storage classes.

13. The computer program product according to claim 12 wherein the program code further causes said at least one processing platform to generate a stub file of the plurality of stub files in the source storage location for respective ones of the one or more of the plurality of files which have been migrated.

14. The computer program product according to claim 13 wherein the plurality of stub files comprise metadata about the destinations in the target storage location corresponding to the respective ones of the plurality of storage classes.

15. The computer program product according to claim 11 wherein the display of the progress of the assignment further comprises an identification of the last file access time of the given file.

16. The method of claim 10 further comprising generating a stub file of the plurality of stub files in the source storage location for respective ones of the one or more of the plurality of files which have been migrated.

17. The method of claim 9 wherein the display of the progress of the assignment further comprises an identification of the last file access time of the given file.

18. The apparatus of claim 1 wherein the display of the progress of the assignment further comprises an identification of the last file access time of the given file.

19. The computer program product according to claim 11 wherein the one or more rules further correspond to at least one of a file modification time, a file attribute change time, a file size, a file name and a directory name.

20. The method of claim 9 wherein the one or more rules further correspond to at least one of a file modification time, a file attribute change time, a file size, a file name and a directory name.

* * * * *